(12) United States Patent
Geates

(10) Patent No.: US 9,050,947 B2
(45) Date of Patent: Jun. 9, 2015

(54) HYDRAULIC LEVELING SYSTEM IMPROVEMENTS

(71) Applicant: Actuant Corporation, Menomonee Falls, WI (US)

(72) Inventor: Harold W. Geates, Berrien Springs, MI (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

(21) Appl. No.: 14/456,056

(22) Filed: Aug. 11, 2014

(65) Prior Publication Data

US 2015/0054271 A1  Feb. 26, 2015

Related U.S. Application Data

(60) Provisional application No. 61/869,303, filed on Aug. 23, 2013.

(51) Int. Cl.
*B60S 9/08* (2006.01)
*B60S 9/12* (2006.01)

(52) U.S. Cl.
CPC .................................. *B60S 9/12* (2013.01)

(58) Field of Classification Search
CPC ......................................................... B60S 9/08
USPC ........... 280/766.1, 6.15–6.157; 200/223, 220, 200/226
See application file for complete search history.

(56) References Cited

U.S. PATENT DOCUMENTS

| | | | |
|---|---|---|---|
| 5,176,391 A | 1/1993 | Schneider et al. | |
| 5,312,119 A | 5/1994 | Schneider et al. | |
| 5,628,521 A | 5/1997 | Schneider et al. | |
| 5,676,385 A * | 10/1997 | Schneider et al. | 280/6.153 |
| 5,890,721 A * | 4/1999 | Schneider et al. | 280/6.153 |
| 5,901,969 A * | 5/1999 | Schneider et al. | 280/6.153 |
| 5,913,525 A | 6/1999 | Schneider et al. | |
| 5,915,700 A * | 6/1999 | Schneider et al. | 280/6.153 |
| 5,999,126 A * | 12/1999 | Ito | 342/357.25 |
| 6,050,573 A * | 4/2000 | Kunz | 280/6.153 |
| 6,848,693 B2 * | 2/2005 | Schneider | 280/6.153 |
| 7,025,178 B2 * | 4/2006 | Wengelski et al. | 187/277 |
| 7,025,361 B1 * | 4/2006 | Erickson | 280/6.153 |
| 7,815,200 B2 | 10/2010 | Bakshi | |
| 8,424,848 B1 * | 4/2013 | Hawkins, Jr. | 254/423 |
| 2003/0094316 A1 * | 5/2003 | Schneider | 180/41 |

* cited by examiner

*Primary Examiner* — John Walters
*Assistant Examiner* — James Triggs
(74) *Attorney, Agent, or Firm* — Michael Best & Friedrich LLP

(57) ABSTRACT

A hydraulic leveling system for a vehicle has at least one set of hydraulic jacks that are extended by applying hydraulic pump pressure to an extend side of the jacks and are retracted by relieving hydraulic pressure from the extend side and applying hydraulic pressure to a retract side of the jacks. A pressure sensor has a pressure set point that when it is exceeded the system generates a signal indicating retraction of the jacks. The system operates so that after the pressure sensor set point is exceeded, the system turns off the pump and continues to hold open a valve that applies pressure from the pump to the retract side of the jacks for a period of time and that permits flow to continue from the extend side of the jacks to tank. After such period of time the system once again checks whether the pressure sensor is still activated and if it is not still activated, the system turns the pump back on and continues to retract the jacks.

10 Claims, 6 Drawing Sheets

HYDRAULIC LEVELING SYSTEM IMPROVEMENTS

CROSS-REFERENCE TO RELATED APPLICATIONS

This claims the benefit of U.S. Provisional Patent Application No. 61/869,303 filed Aug. 23, 2013, the disclosure of which is hereby incorporated by reference for all purposes.

STATEMENT CONCERNING FEDERALLY SPONSORED RESEARCH OR DEVELOPMENT

Not applicable.

FIELD OF THE INVENTION

The invention relates to a system and method of leveling a vehicle particularly adapted for cold weather operation.

BACKGROUND OF THE INVENTION

In the area of recreational vehicles such as travel trailers and motor homes, and other on-highway and off-highway vehicles, there is a need for leveling when these vehicles are parked for use. Recreational vehicles and campers are usually parked in campsites where the parking area is not always level. Off-highway vehicles may be parked in much more uneven terrain. Various systems are found in the prior art relating to leveling such vehicles.

These systems include at least a lift mechanism and a level sensing device. Generally, the designs use mechanical, electromechanical, or hydraulic jack jacks and level sensors for leveling the vehicle. The devices are strategically mounted to the underbody or chassis of the vehicle to achieve the leveling quickly and efficiently. The number of jacks and level sensors used in each application is dependent on the size and weight of the vehicle being supported, among other things. In one example, a recreational vehicle is equipped with four jacks in the form of hydraulic cylinders mounted to the vehicle frame. Two jacks are located adjacent to the rear of the vehicle and two jacks are located adjacent to the front of the vehicle. In another example, a vehicle leveling system has three jacks, two of which are located at the rearward end of the vehicle and one of which is located at the forward end of the vehicle. Other systems may have more or fewer jacks. Such systems are described, for example, in U.S. Pat. Nos. 5,176,391; 5,312,119; 5,628,521; 5,676,385; 5,901,969; 5,913,525; 5,890,721; 5,915,700; 6,848,693; 7,025,178 and 7,815,200.

Such systems may employ jacks that are hydraulically powered to extend and retract. Sensing that the jacks have fully retracted is sensed by an elevated hydraulic pressure in the system, sensing the pressure applied to the retract side of the jacks. That works well when the viscosity of the hydraulic fluid is in a normal range and there are no other obstructions in the hydraulic system, such as dirt or a pinched hose, or in extreme cold. Under those conditions, due to the resistance of the fluid on the extend side of the jacks to return to tank, an elevated pressure may develop on the retract side that is sufficient to trip the pressure sensor and give a false positive indication that the jacks are fully retracted. With that indication, the driver may attempt to move the vehicle, even with the jacks not fully retracted, which is an undesirable condition.

The present invention is aimed at assuring full retraction of the jacks even under such conditions.

SUMMARY OF THE INVENTION

The invention provides a hydraulic leveling system with an auto-retract sequence that turns off the pump and holds open the retract valves for a period of time after the pressure sensor set point is exceeded to permit the residual pressure in the system to be relieved to tank. After such period of time the system once again checks whether the pressure sensor is still activated and if it is not still activated, the system turns the pump back on and continues to retract the jacks. Thereby, the system gives the fluid on the extend side of the jacks time to return to tank and relieve excess pressure on the retract side that was caused by the back pressure on the extend side, which can occur in cold weather conditions.

If after the period of time the pressure sensor is still activated, the jack valves are closed and the auto-retract sequence is terminated.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

The concepts described below and shown in the accompanying figures are illustrative of an example implementation of the inventive concepts. One skilled in the art will appreciate that the inventive concepts described herein can be modified and incorporated into many other applications. Throughout the description, terms such as front, back, side, top, bottom, up, down, upper, lower, inner, outer, above, below, and the like are used to describe the relative arrangement and/or operation of various components of the example embodiment. None of these relative terms are to be construed as limiting the construction or alternative arrangements that are within the scope of the claims.

Figure 1:
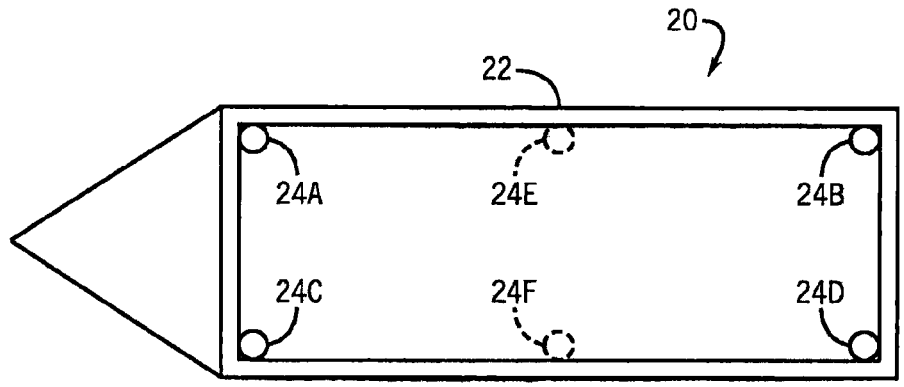
FIG. 1 is a top plan schematic view of a vehicle frame, in this case a trailer bed, showing the location of four stabilizers at the corners of the bed, with an optional two stabilizers (shown in phantom) centered between the end stabilizers on each side of the bed.

Referring to FIG. 1, a vehicle 20 has a frame or bed 22 to which is affixed at its corners a respective stabilizer or leveling jack 24A, 24B, 24C and 24D. Along the sides, in between the end stabilizers 24A and 24B and between the end stabilizers 24C and 24D, there may optionally be provided an additional two cylinders 24E and 24F for additional support at those locations, although the remainder of the description will be limited to a four stabilizer system, having the stabilizers 24A-D.

Figure 2:
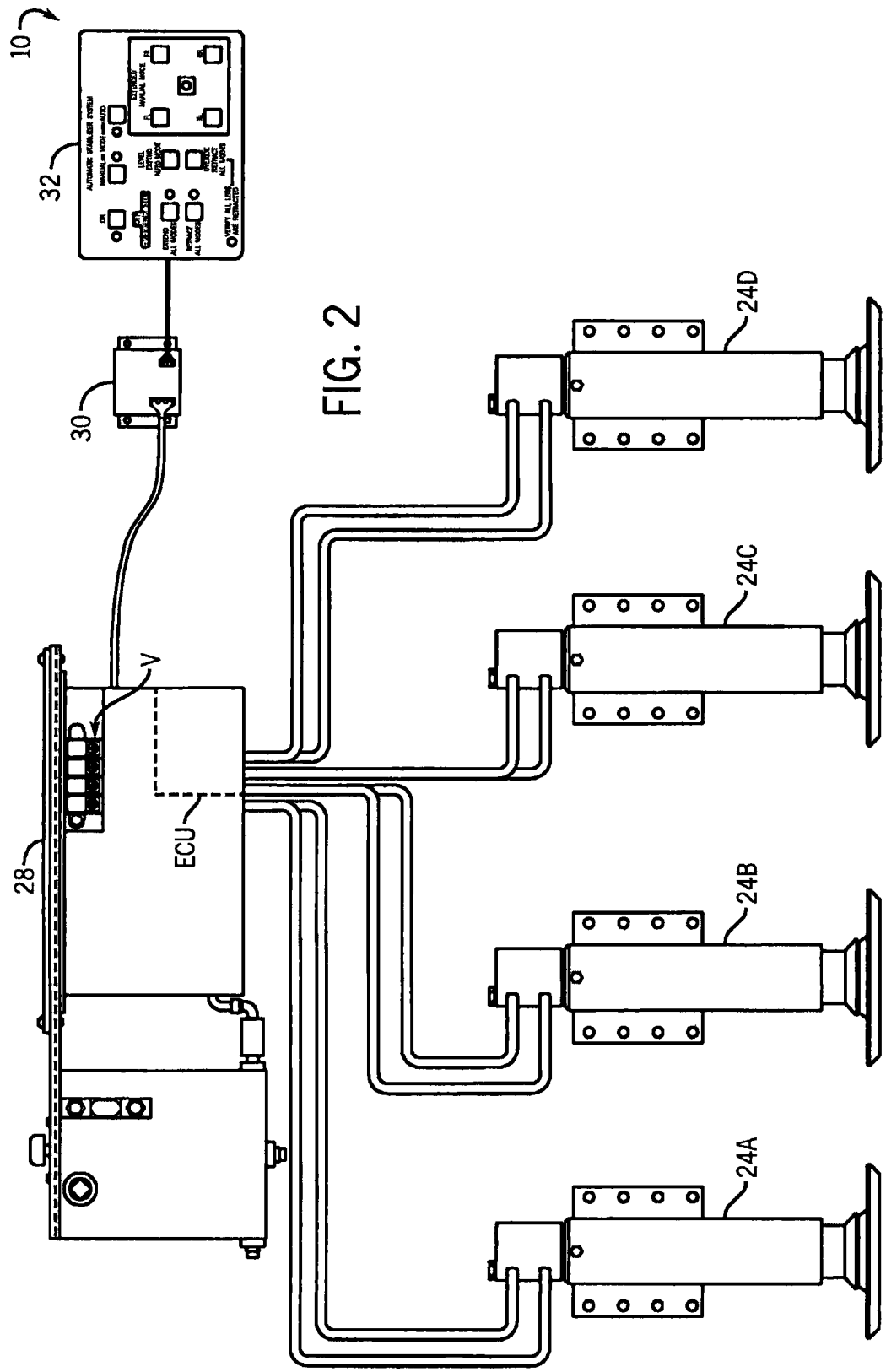
FIG. 2 is a schematic view of the major elements of the system including the stabilizer jacks, the control box, the level sensor, and the touch pad.

FIG. 2 illustrates a schematic illustration of a system 10 of the invention including the stabilizer or leveling jacks 24A-D. Each of the jacks 24A-D, which are conventional jacks, includes a hydraulic cylinder which extends and retracts the jack to vary its length, as is well known. Such jacks are commercially available, for example, from Power-Packer, an Actuant Company, Menomonee Falls, Wis.

Figure 4:
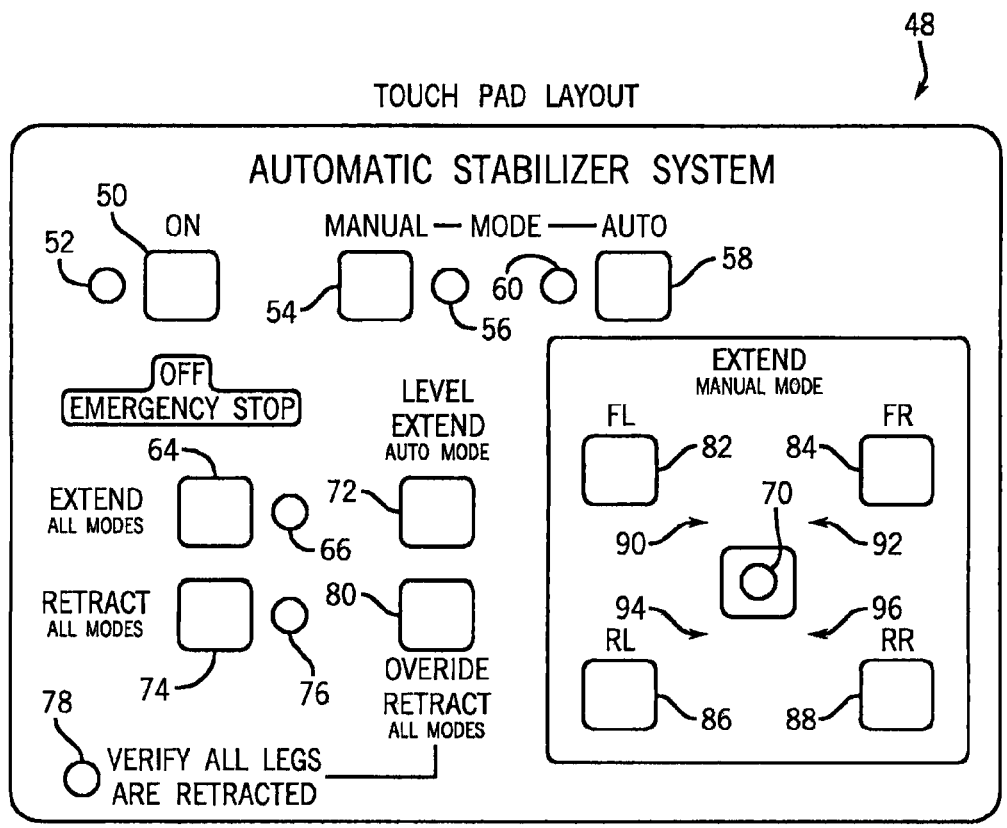
FIG. 4 is a plan view of the touch pad layout for the system.

Each of the jacks 24A-D is hydraulically connected by two lines to a hydraulic control box 28, which includes a pump, reservoir, control valves and an electronic control unit (ECU) that receives inputs from a level sensor 30 and a touch pad 32, the touch pad 32 being shown in FIG. 4. The level sensor is any suitable type of level sensor, preferably an electronic sensor as is used in recreational vehicle automatic leveling systems, which is capable of sensing the orientation of a plane in two dimensions, so as to enable achieving a level orientation simultaneously in two dimensions. An electronic control unit (ECU) which is included in the control box is any suitable electronic controller (e.g., a microprocessor based central processing unit) capable of executing the control method described below.

Figure 3:
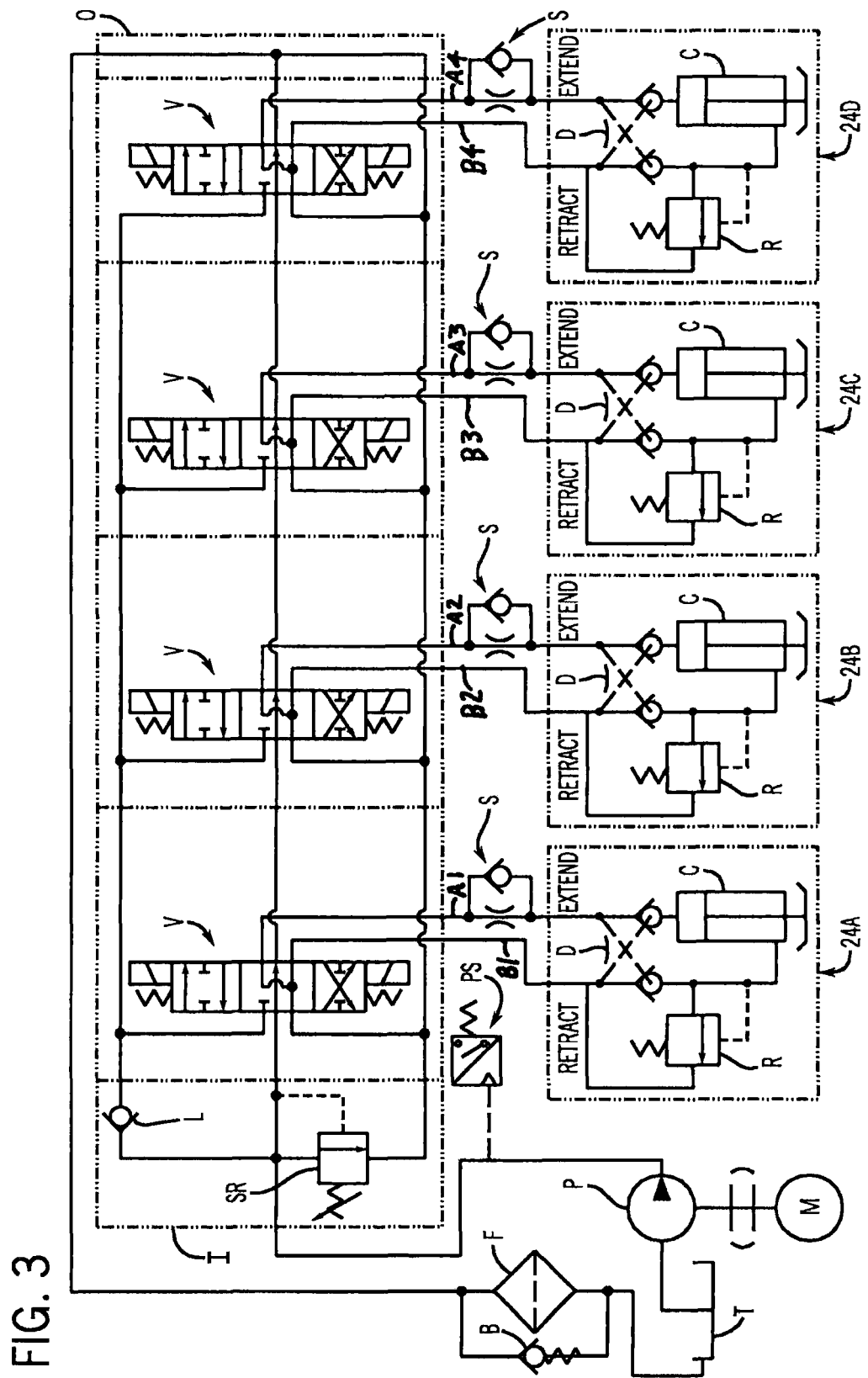
FIG. 3 is an electrohydraulic schematic circuit diagram for the system.

Referring to FIG. 3, each jack 24A-D includes a double acting cylinder C, a pressure relief valve R, and a dual pilot operated check valve D. Valve D requires pressure to be present in the hydraulic line being pressurized in order to release the pressure on the opposite side of the cylinder. This acts as a safety device so that if a line is broken or cut, the cylinder will not move.

Each of the extend lines leading to each of the jacks 24A-D also includes a shunt valve S which allows flow past the check valve when extending the jacks and slows the flow out the bore side of the cylinder by routing it through an orifice to slow down retraction of the cylinders. The retract lines are connected to the rod sides of the cylinders C as illustrated.

Each of the jacks 24A-D is connected to and controlled by a six-way, three-position open center valve V. At the left of the valves V is an inlet valve section I (the left most broken line box) which includes a ball check valve L and the system relief valve SR. A pressure switch PS is also provided which senses full pressure to determine when the jacks are fully up or fully down. When fully up, the pressure switch PS senses the pressure applied to the rod sides (retract sides) of the jacks 24A-D and when fully down it senses the pressure applied to the bore sides (extend sides) of the jacks 24A-D. At the right of the valves V is the outlet valve section O. A filter F and spring biased check valve B are in the outlet or tank line which runs from the outlet valve section O back to tank T. Pump P provides a source of pressurized fluid and is driven by motor M.

The solenoid-operated valves V are controlled by the electronic control unit ECU which is contained in the control box 28. The ECU receives its inputs from the level sensor 30 and the touch pad 32, and is programmed to provide the following operation of the system.

Referring to FIG. 4, the system is turned on by pressing the ON button 50 which lights LED 52. Next, an operator selects either manual mode by pressing button 54 which lights LED 56 or AUTO button 58 which lights LED 60. The operator is able to select between manual or automatic mode anytime during operation. Also, to calibrate the system, in other words, to zero out the controls and calibrate the level sensor to a level orientation, a combination of buttons or a sequence of buttons of the touch pad 48 may be pressed to place the system in calibration mode. The system is programmed to automatically shut off when it has not been used for a period of time, for example, five minutes. The pre-set pressure limit of the pressure switch PS is preferably around 2500 psi to notify the controls when the jacks have reached their fully extended or fully retracted positions. Upon receipt of this signal, in prior art systems the system would typically shut off.

To operate the system 10 in automatic mode to extend the stabilizer jacks 24A-D, the system is first turned on, and the LED 52 will illuminate. Next, the operator presses the AUTO button and LED 60 will illuminate. Following that, the operator presses the EXTEND button 64 which illuminates LED 66 and places the system in an automatic retract mode to confirm that the jacks are starting from a fully retracted position. During this time period, the controls will ignore the output of the level sensor so it does not matter if the vehicle is out of level at the beginning of this sequence. When the jacks are fully retracted, the pressure switch PS is activated, and the system goes into the automatic extend mode. The output of the pressure switch PS is an input to the ECU. In the automatic extend mode, the ECU will operate the valves V to first extend the front jacks to the ground. When motion caused by the jacks coming into contact with the ground is detected by the level sensor, the ECU will operate the valves to verify that both front jacks are touching the ground via left/right movement, and then the ECU will cease actuating the valves V to stop movement. Next, the rear jacks will be extended to the ground by the ECU operating the valves V. When motion at the rear is detected, both rear jacks will be verified to be touching the ground via left/right movement by the ECU operating the valves V of the left and right rear jacks, and when movement is verified, the ECU will stop actuating the valves V so as to cease movement.

The system will then level the platform of the vehicle utilizing all four jacks 24A-D independently as needed. Whichever jack needs to be extended to reach a level orientation of the sensor 30 will be extended until the level orientation is achieved. Upon achieving the level orientation, an LED 70 will be illuminated. If the jacks 24A-D reach full extension, the pressure switch PS will be activated, and the system will be shut off by the ECU.

In addition, the system 10 has a level extend feature. Using this feature, an operator can raise the platform to a desired height after the platform has been automatically leveled, and the system remains in the auto (LED 60 illuminated) mode. To "level extend", the operator presses and holds the LEVEL EXTEND button 72. When that is done, all four jacks 24A-D will be extended by the ECU controlling the valves V while keeping the platform within a certain specified number of degrees of level, for example within one degree of level. If the jacks 24A-D reach full extension and the pressure switch PS is activated, the system will be shut off.

Another feature of the system is that the jacks 24A-D can be operated to retract while maintaining a level orientation (level retract) also. This is done when an operator wishes to reduce the height of the platform while maintaining it level. To operate the system in this mode, the system is turned on by pressing the button 50, which illuminates LED 52, and the AUTO button 58 is pressed illuminating LED 60. Next, the RETRACT button 74 is pressed, which illuminates LED 76. In response, the ECU operates the valves V so as to retract all four jacks 24A-D while keeping the platform level within the specified number of degrees, for example, within one degree of level. Eventually, the platform will be placed on its wheels or other supports and will no longer be supported by the jacks 24A-D. If while it is so supported, it is within the specified number of degrees of level, for example, one degree of level, the jacks 24A-D will continue to retract until they are fully retracted, after which time the pressure switch PS will be actuated to turn off the system. However, if when supported by its wheels or other supports the platform is in an orientation that exceeds one degree from level, the system will only try to retract the jack(s) 24A-D on the high side(s) of the platform, resulting in activation of the pressure switch PS and consequent shutting off of the system while leaving the jack(s) on the low side(s) extended. A red hazard LED 78 will be illuminated in that condition which will signal the operator that the jack(s) are possibly still extended (if the system stops while not in a level orientation). Additional retraction of the jacks will only be achieved by the operator depressing the OVERIDE RETRACT button 80 which will place all jacks in retract mode. When full retraction of all jacks 24A-D is achieved and the pressure switch PS is thereby activated, the system will shut off, holding the jacks in the retracted position.

The system also has a manual mode for extending the jacks 24A-D. To operate in the manual mode, the system is turned on by pressing the button 50, which illuminates LED 52. Next the MANUAL button 54 is pressed illuminating LED 56, and then the EXTEND button 64 is pressed illuminating the LED 66. All four jacks 24A-D can now be extended to the ground and continue lifting the platform as the operator presses individual buttons 82, 84, 86, and 88 for the respective jacks 24A-D. Typically, the individual buttons 82, 84, 86, and 88 are depressed by the operator, corresponding to the four jacks 24A-D, to extend the needed jacks to achieve level. If two or more buttons are depressed at the same time, it will activate two or more jacks at the same time accordingly. An LED 90, 92, 94, or 96 will be lit from signals generated by the level sensor 30, to indicate which of the buttons 82, 84, 86, or 88 needs to be pressed to extend the corresponding jack to achieve a level orientation. During the leveling process, the jack(s) whose buttons are being depressed will stop movement when their level condition is achieved but can be overridden by depressing the button again. The operator will need to hold the buttons depressed to perform this operation. It is noted that the EXTEND button 64 will not extend all four jacks 24A-D in the manual mode. Operation in this mode is similar to operation of the system described in U.S. Pat. No. 5,676,385 entitled "Semi-automatic Vehicle Leveling System", the disclosure of which is hereby incorporated herein by reference. Upon achieving a level condition, none of the LEDs 90, 92, 94, or 96 will be illuminated and the LED 70 will be illuminated representing level. If during this process one or more jacks reach full extension, the pressure switch PS will be activated, and the system will be shut off.

The jacks 24A-D can also be retracted in the manual mode. After the system is turned on and the MANUAL button 54 is depressed, the operator presses and holds the RETRACT button 74. All four jacks 24A-D will retract while keeping the system within one degree of level. The operator will have to hold the button depressed to perform this operation. If the platform is no longer being supported by the jacks 24A-D and it is on terrain such that it has an orientation that is more than one degree out of level, the system will only try to retract the jacks on the high side(s) of the platform, resulting in activation of the pressure switch PS and shutting the system off while leaving the jack(s) on the low side(s) extended. The red hazard LED 78 will illuminate, which will signal the operator that the jack(s) are possibly still extended (if the system stops while in a not-level orientation). Additional retraction of the jack(s) will only be achieved by switching to the "manual override retract" mode. When full retraction is achieved and the pressure switch is activated, the system will be shut off.

In the manual override retract mode, the MANUAL button 54 is depressed, followed by depressing the OVERRIDE RETRACT button 80. This is used to retract all the jacks 24A-D ignoring the one degree out of level feature. The reason this feature is needed is if the platform is no longer supported by the jacks 24A-D and is on terrain that exceeds one degree out of level, the system will only try to retract the jack(s) on the high side(s) of the platform, resulting in activating the pressure switch PS, shutting the system off, and leaving the jack(s) on the low side(s) extended. This feature will be the only way for an operator to retract all jacks to their fully retracted position.

What has been described in the preceding paragraphs of this detailed description is similar to the operation of prior art automatic leveling systems and is only intended as a description of a leveling system to provide context for the invention. The invention could be applied to the above described system, or any other hydraulic leveling system in which jack retraction is sensed by an elevated hydraulic pressure, and so the invention is not limited to the above described system.

The invention involves the auto-retract part of the system. Sensing an elevated hydraulic pressure with the pressure switch PS works well when the viscosity of the hydraulic fluid is in a normal range and there are no other obstructions in the hydraulic system, such as dirt or a pinched hose, or in extreme cold. Under those conditions, due to the resistance of the fluid to return to tank, an elevated pressure may develop sufficient to trip the pressure sensor and indicate that the jacks are fully retracted. With that indication, the driver may attempt to move the vehicle, even with the jacks not fully retracted, which is an undesirable condition and could result in damage to the equipment.

Figure 5:
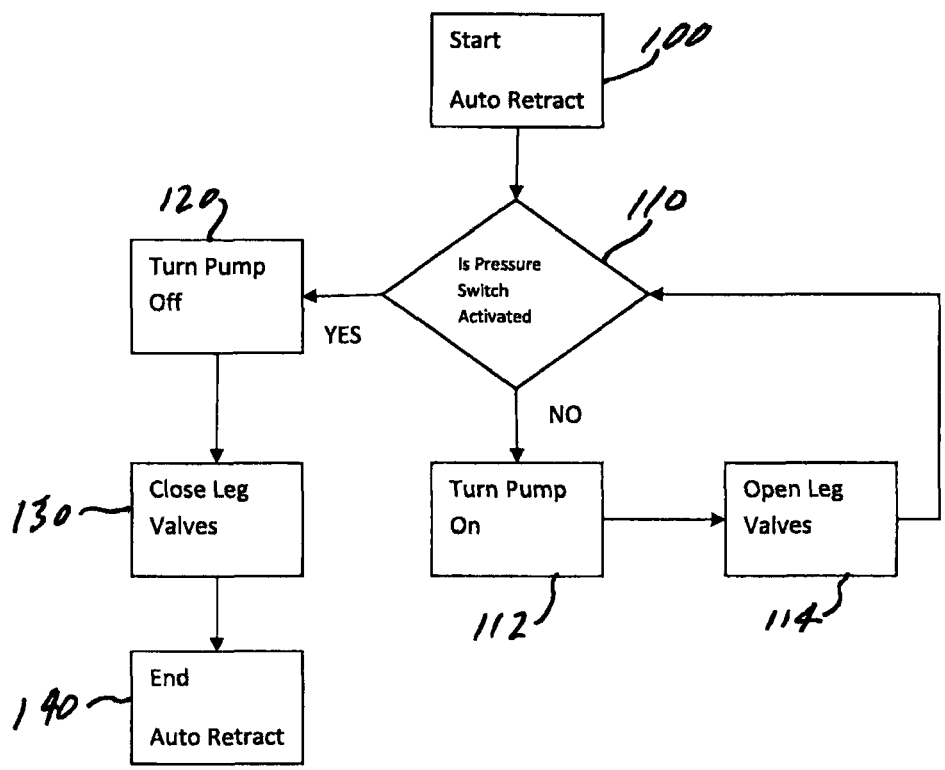
FIG. 5 is a schematic view of a prior art control method for operating a vehicle leveling system.

Referring to FIG. 5, the control method used to operate the ECU during the auto-retract portion of the sequence in the prior art system is illustrated. In that sequence, when the auto-retract button is pressed by the operator at 100, the pump and valves are actuated to retract the jacks via loop 110-112-114 until the pressure switch is activated. The pressure on the retract side of the hydraulic system rises at the end of the retraction stroke, which activates the pressure switch PS at 110 when its pressure set point is reached, indicating full retraction of the jacks. When that happens the pump and valves are turned off at 120, the valves are closed at 130 and the sequence is ended at 140 by the ECU.

With this mode of operation, during cold weather operation fluid flow from the extend side of the hydraulic system to the reservoir is restricted due to the increased fluid viscosity from the cold weather creating back pressure in the system. Back pressure from the extend side of the system elevates the pressure on the retract side which causes the pressure switch set point to be reached before the jacks are fully retracted. The pump and valves can therefore be prematurely deactivated, trapping pressure in both sides of the hydraulic system. This trapped pressure provides a false "jacks up" signal.

Figure 6:
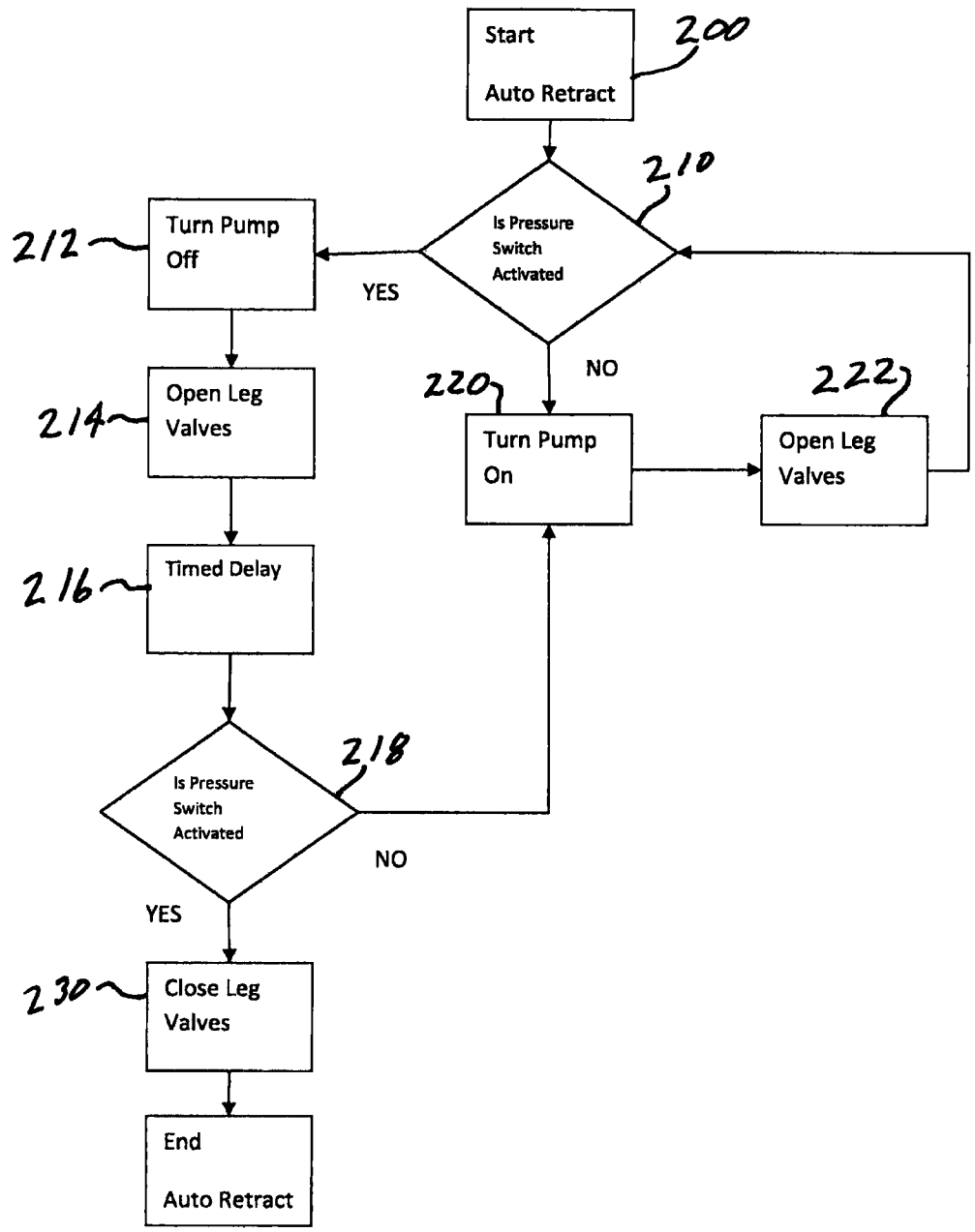
FIG. 6 is a schematic view of a control method of the invention for operating a vehicle leveling system.

FIG. 6 illustrates the new control method that resolves such false jacks up signals. In FIG. 6, when the auto retract button is pressed by the operator at 200, if the pressure switch set point is reached at decision point 210, the pump is deactivated at 212 (possibly after a delay, e.g., 3 seconds) but the valves are left open at 214 for an additional period of time at 216. This period may be, for example, 0.5-30 seconds or more (e.g., 20 seconds), depending on the anticipated conditions of operation. Leaving the valves open (in their retract position) permits flow from the extend (bore) sides of the jacks a longer period to flow back to tank so as to allow any back pressure to dissipate and eliminate trapped pressure on the extend side of the system. If the jacks are not fully retracted, the pressure on both sides (extend and retract) of the hydraulic system will drop below the set point of the pressure switch PS as the back pressure relieves, yielding a negative at 218 to restart the retract sequence—turning on the pump at 220 and the jack valves at 222 and back to decision point 210 to continue retracting the jacks until the pressure switch PS stays activated beyond the timed delay of 216. This cycle is repeated by the ECU a finite number of times (e.g., 5 times) or until the jacks are fully retracted. If within 5 tries the pressure switch actuation is still not maintained, then a retract error signal is generated and can be displayed to the operator.

Full retraction of the jacks is indicated as usual by reaching the set point of the pressure switch, which pressure is maintained on the retract (rod) side of the jacks when full retraction is reached. When the jacks are fully retracted, pressure on the retract side will be maintained and the pressure switch will provide the "jacks up" signal and a positive at 218 so as to proceed to 230 where the jack valves are closed (shut off) and the routine is terminated.

This functionality can also be added to the "Emergency Retract" sequence to verify jack retraction any time the start of vehicle movement is indicated, for example, if the operator shifts the transmission of the vehicle out of "Park". For example, the jack valves could be turned on (opened) for 20 seconds any time the onset of vehicle motion is detected (shifting out of Park) to ensure that all jacks are fully retracted. If not, an emergency retract cycle would be initiated. A delay (e.g., 20 seconds) in which the valves are held open after the pressure switch is actuated could also be incorporated in the emergency retract cycle, like in the auto retract cycle.

Figure 7:
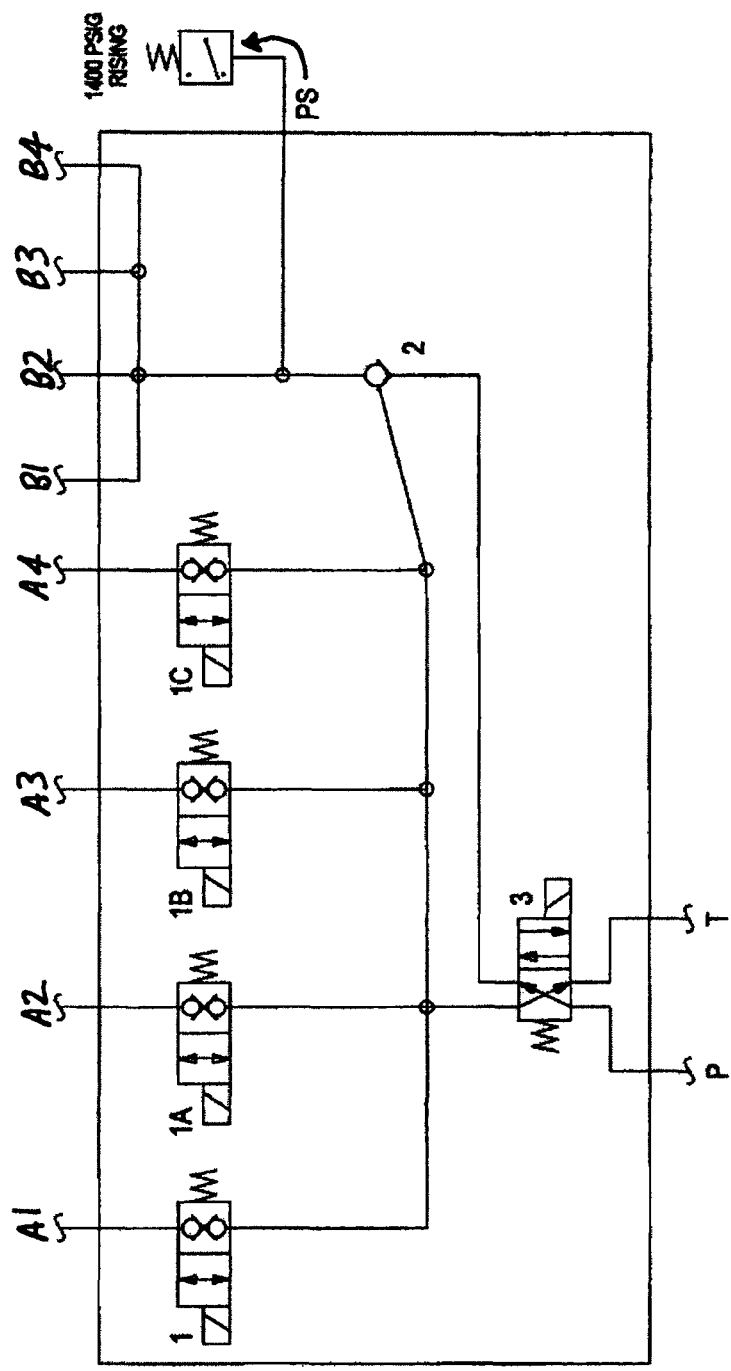
FIG. 7 is a schematic view like FIG. 3 but of an alternative hydraulic system to which the invention can be applied.

FIG. 7 illustrates an alternate embodiment of a typical hydraulic leveling system suited for RV's to which the invention can be applied in which two way, two position solenoid operated jack valves 1, 1A, 1B and 1C control the pressure to and from the extend side of the four respective jacks. These valves would be connected to points A1, A2, A3 and A4 in the system of FIG. 3 instead of the valve block I, and the pressure switch PS is relocated from the position in FIG. 3 to the position in FIG. 7 so it only senses pressure at all times on the retract side of the jacks 24A-D. Pump and tank connections are indicated by P and T at the bottom of FIG. 7. The retract sides of the jacks, indicated by B1, B2, B3 and B4, are labeled accordingly in FIGS. 3 and 7. Alternatively, A1-4 in FIG. 7 could be connected directly to the extend (bore) side pressure chambers of the respective jacks 24A-D and the retract lines B1-4 could be connected directly to the retract (rod) side pressure chambers of the jacks 24A-D. The circuit in FIG. 7 also has a pilot pressure operated one way check valve 2 that is opened to flow through it toward the tank when there is pilot pressure between the individual jack valves 1, 1A, 1B and 1C and the two way, two position solenoid operated extend/retract valve 3, i.e., when the jacks are being extended so fluid can flow from the retract sides of the jacks. The valve 2 otherwise permits flow through it toward the jacks in the retract position (normal position) of the valve 3 when the pump is operated.

The invention can be applied to the hydraulic control system of FIG. 7 in the same way as described above with respect to the system of FIG. 3. Just like in the system of FIG. 3, the system turns off the pump and continues to hold open valves 3 and 1, 1A, 1B and 1C so as to apply pressure from the pump to the retract side of the jacks and permit fluid to drain from the extend side of the jacks for a period of time and after such period of time the system once again checks whether the pressure sensor PS is still activated and if it is not still activated, turns the pump back on and continues to retract the jacks under the power of the pump.

A preferred embodiment of the invention has been described in considerable detail. Many modifications and variations to the preferred embodiment described will be apparent to a person of ordinary skill in the art. Therefore, the invention should not be limited to the embodiment described.

I claim:
1. A hydraulic leveling system for a vehicle, comprising:
at least one set of double acting hydraulic jacks, each jack having an extend side to which hydraulic fluid under pressure is admitted to extend the jack and from which hydraulic fluid exits to retract the cylinder and a retract side to which hydraulic fluid under pressure is admitted to retract the jack and from which hydraulic fluid exits to extend the cylinder;
hydraulic fluid;
a pump that pressurizes the hydraulic fluid;
a reservoir from which the pump draws hydraulic fluid and to which hydraulic fluid is returned;
valves in communication with the jacks, pump and reservoir that are selectively actuable to extend one or more of the jacks by applying hydraulic pump pressure to the extend side and relieve hydraulic pressure from the retract side of the one or more of the jacks and to retract one or more of the jacks by applying hydraulic pump pressure to the retract side and relieve hydraulic pressure from the extend side of the one or more of the jacks;
a pressure sensor with a pressure set point that is actuated when the pressure set point is exceeded, in response to which the system generates a signal indicating retraction of the jacks; and
a controller connected to the pump, valves and pressure sensor that operates so that after the pressure sensor set point is exceeded, the system turns off the pump and continues to hold open one or more of the valves to apply pressure from the pump to the retract side of the jacks and permit flow from the extend side of the jacks to be relieved for a delay period of time after which the controller checks whether the pressure sensor is still activated and if it is not still activated, turns the pump back on and continues to retract the jacks.

2. A hydraulic leveling system as in claim 1, wherein if after said delay period the pressure sensor is still activated, the valves are de-actuated and the auto-retract sequence is terminated.

3. A hydraulic leveling system as in claim 1, wherein the controller operates so that turning off of the pump is delayed for a pump delay period of time after the pressure switch is actuated.

4. A hydraulic leveling system as in claim 1, wherein the valves are kept open for a period of time between 0.5 and 30 seconds after the pressure switch is actuated prior to the system checking for whether the pressure switch is still actuated.

5. A hydraulic leveling system as in claim 1, wherein the cycle of actuating the valve and checking the pressure sensor switch is repeated a finite number of times and if the pressure switch does not stay actuated after the finite number of times a retract error signal is generated and displayed.

6. A method of operating a hydraulic leveling system for a vehicle, the system having at least one set of hydraulic jacks that are extended by applying hydraulic pump pressure to an extend side of the jacks and are retracted by relieving hydraulic pressure from the extend side and applying hydraulic pressure to a retract side of the jacks and that has a pressure sensor with a pressure set point that when it is exceeded, the system generates a signal indicating retraction of the jacks, wherein the system operates so that after the pressure sensor set point is exceeded, the system turns off the pump and continues to hold open one or more valves that apply residual pressure from the pump to the retract side of the jacks and permits flow from the extend side of the jacks to be relieved for a delay period of time after which the system once again checks whether the pressure sensor is still activated and if it is not still activated, turns the pump back on and continues to retract the jacks.

7. A method as in claim 6, wherein if after said delay period the pressure sensor is still activated, the valves are de-actuated and the auto-retract sequence is terminated.

8. A method as in claim 6, wherein turning off of the pump is delayed for a pump delay period of time after the pressure switch is actuated.

9. A method as in claim 6, wherein the valves are kept open for a period of time between 0.5 and 30 seconds after the pressure switch is actuated prior to the system checking for whether the pressure switch is still actuated.

10. A method as in claim 6, wherein the cycle of actuating the valve and checking the pressure sensor switch is repeated a finite number of times and if the pressure switch does not stay actuated after the finite number of times a retract error signal is generated and displayed.

\* \* \* \* \*